Dec. 15, 1942.  R. S. AVERY  2,304,787
NON-DRYING ADHESIVE LABEL AND METHOD AND APPARATUS FOR MAKING SAME
Filed April 12, 1939  5 Sheets-Sheet 1
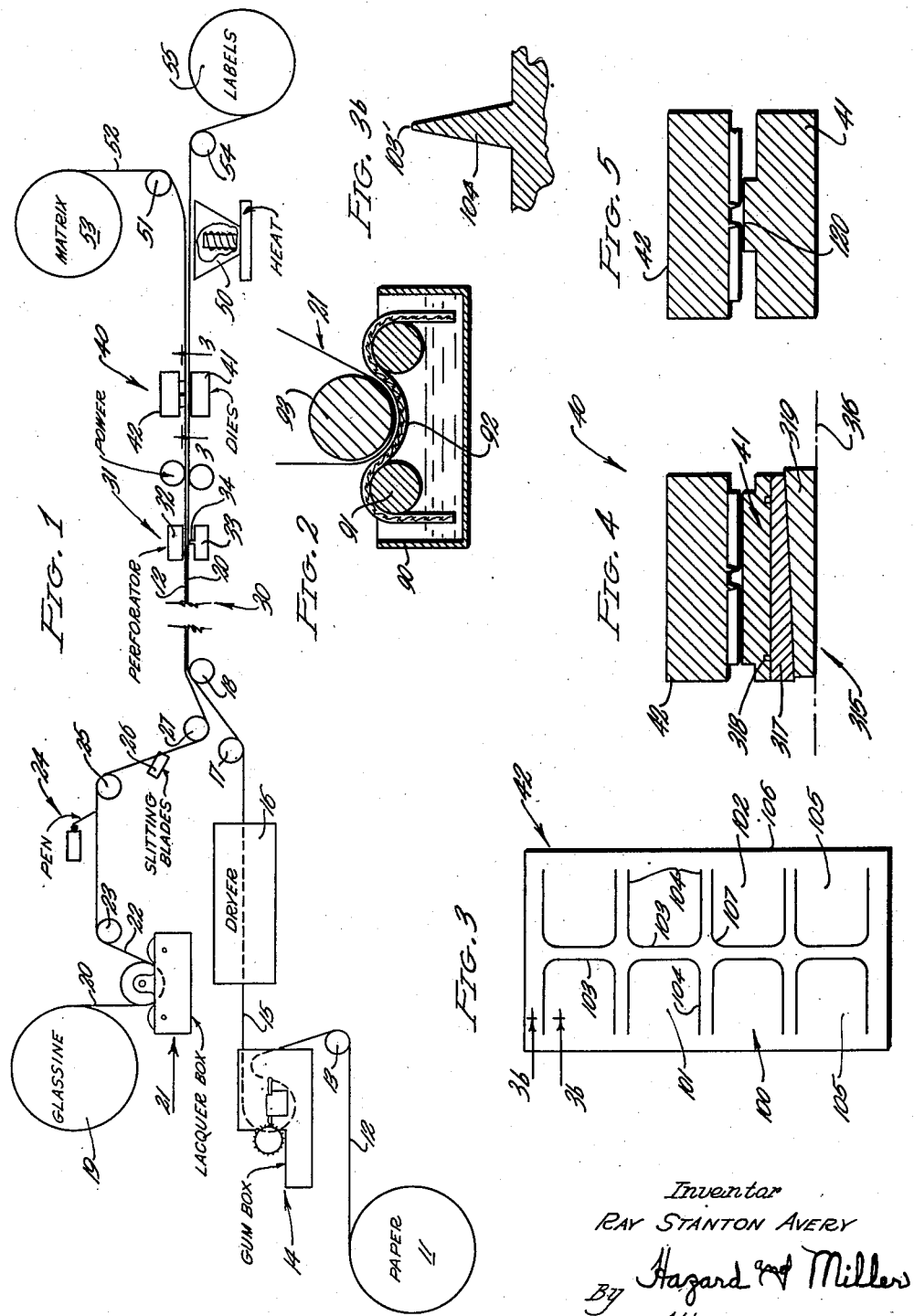
Inventor
RAY STANTON AVERY
By Hazard and Miller
Attorneys

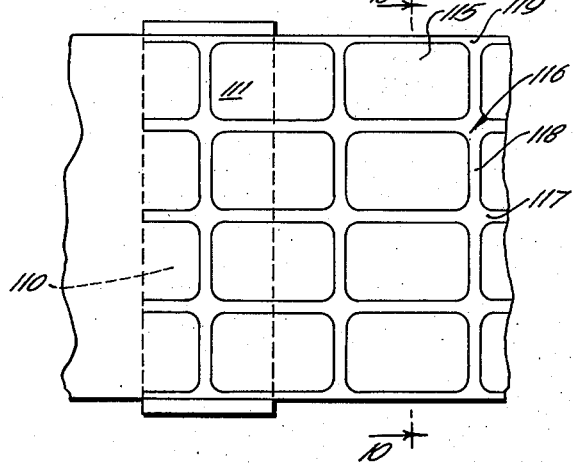
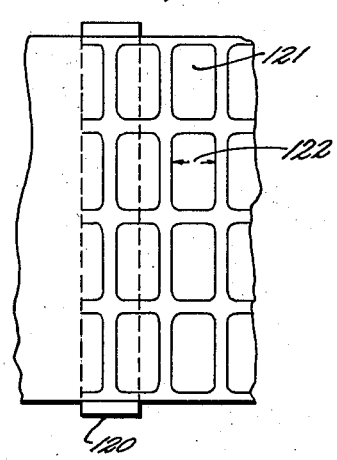
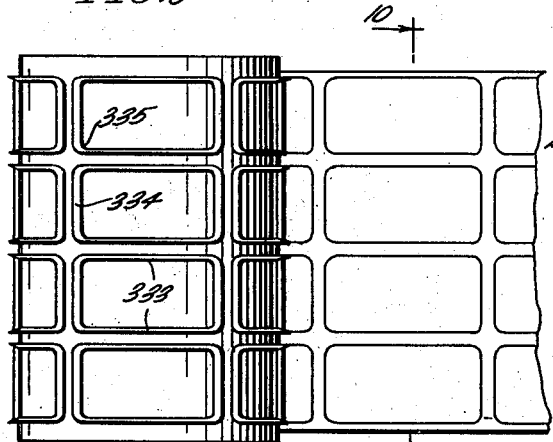
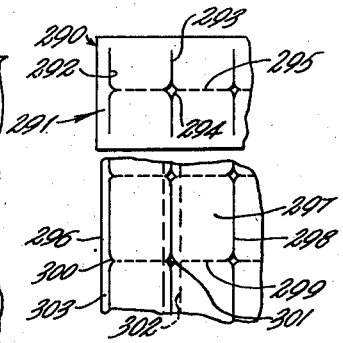
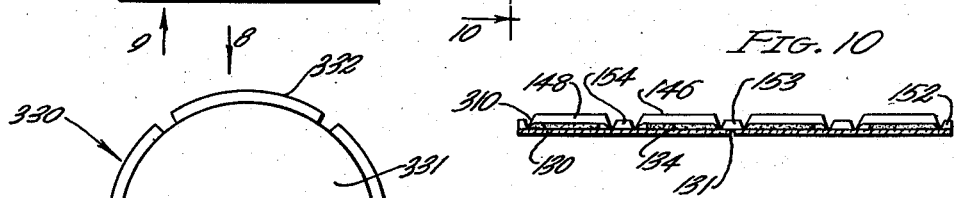
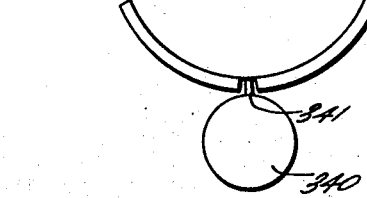
Inventor
RAY STANTON AVERY
By Hazard and Millers
Attorneys Dec. 15, 1942.  R. S. AVERY  2,304,787
NON-DRYING ADHESIVE LABEL AND METHOD AND APPARATUS FOR MAKING SAME
Filed April 12, 1939   5 Sheets-Sheet 3
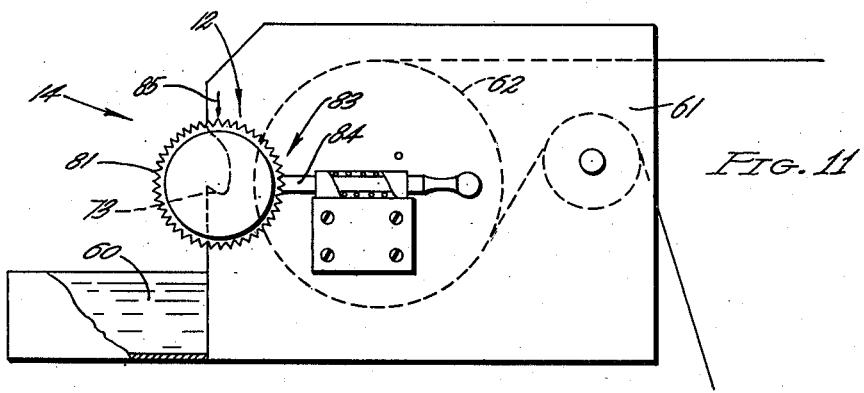
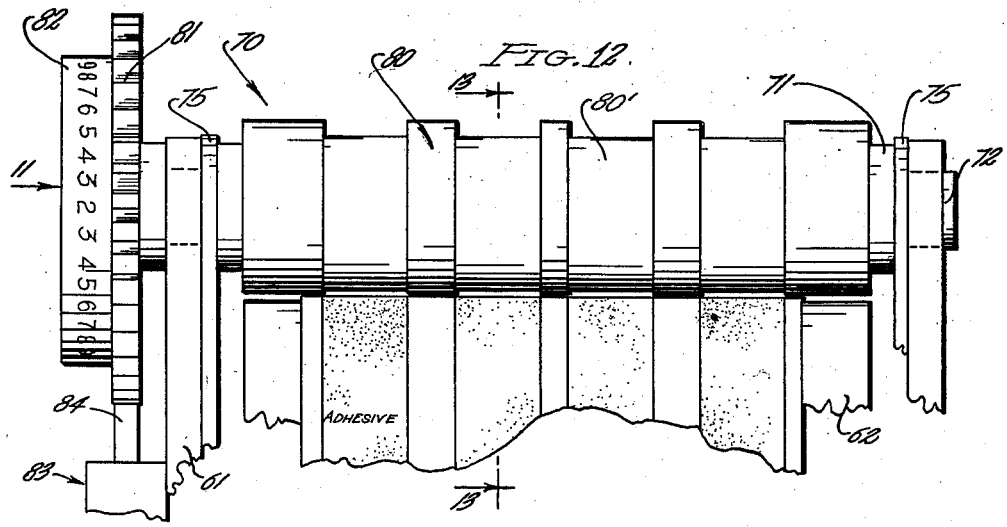
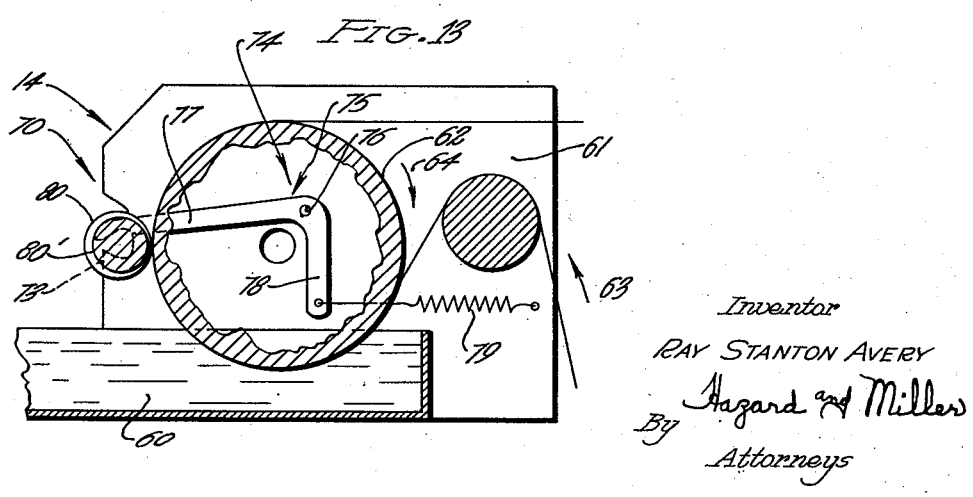
Inventor
RAY STANTON AVERY
By Hazard and Miller
Attorneys

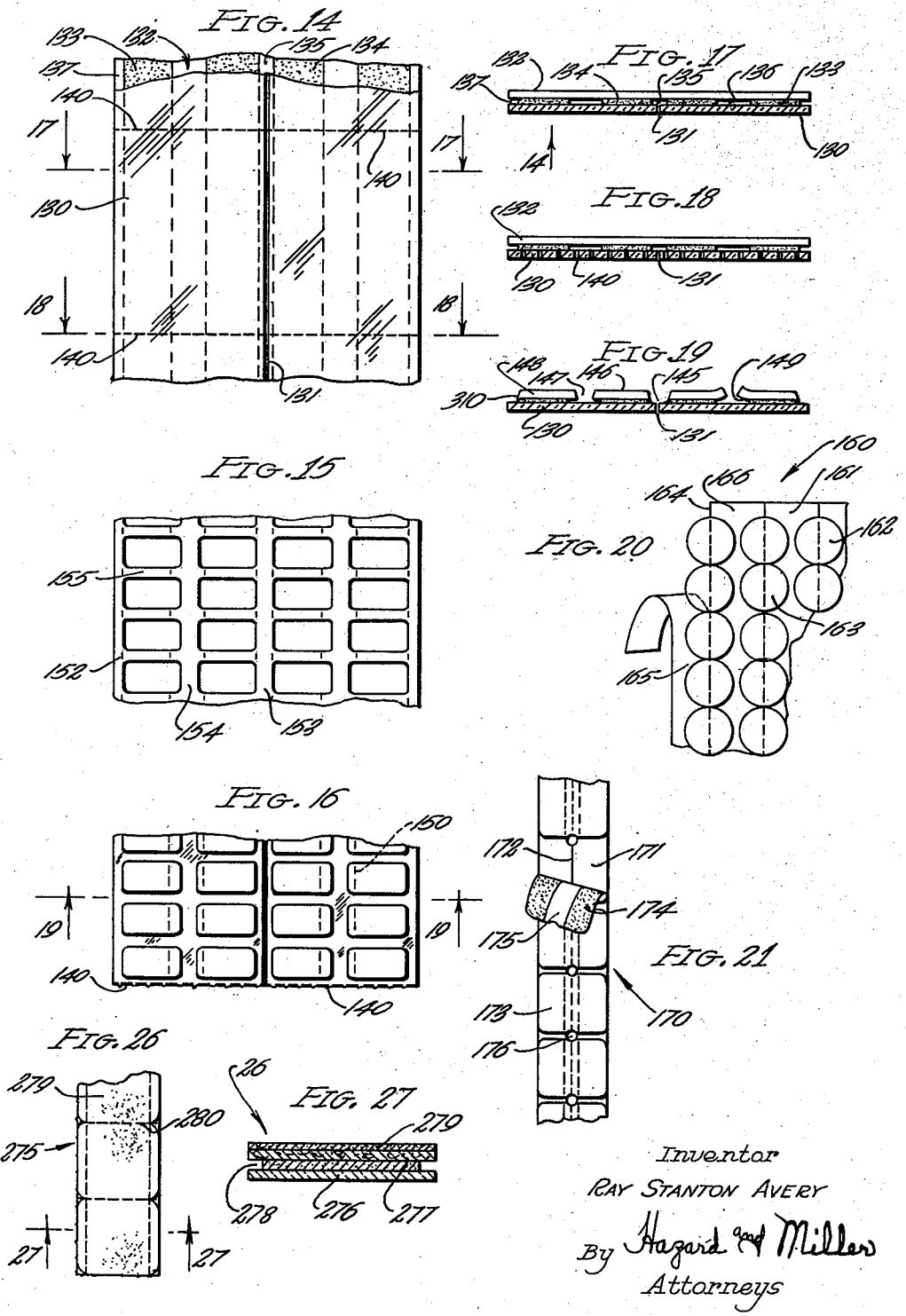

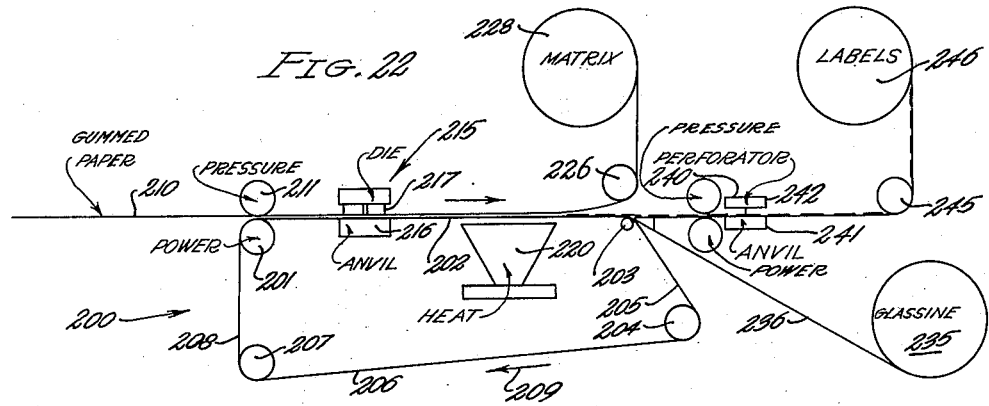
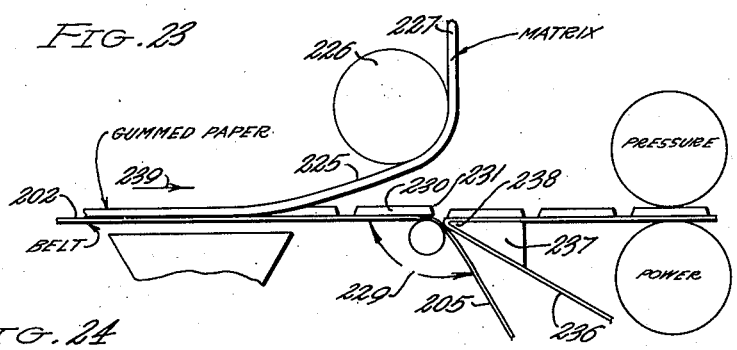
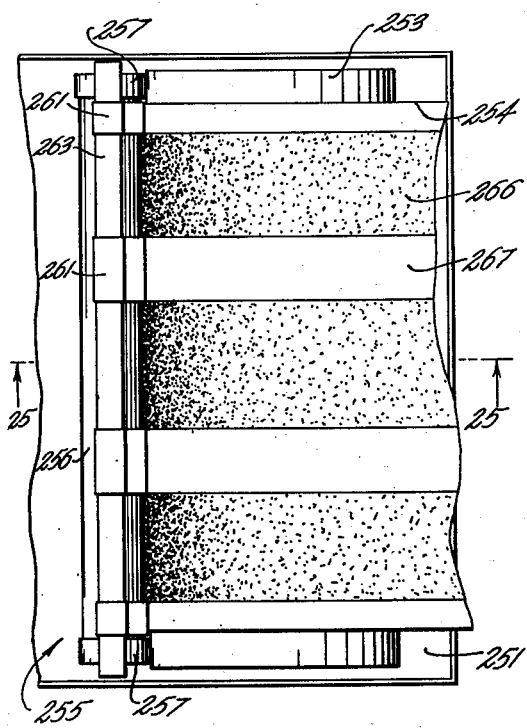
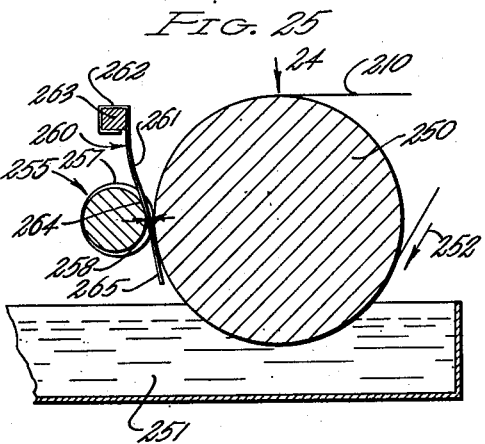

Patented Dec. 15, 1942

2,304,787

UNITED STATES PATENT OFFICE 2,304,787

NONDRYING ADHESIVE LABEL AND METHOD AND APPARATUS FOR MAKING SAME

Ray Stanton Avery, Los Angeles, Calif.

Application April 12, 1939, Serial No. 267,391

10 Claims. (Cl. 154—1)

My invention relates to the method for making non-drying pressure-sensitive adhesive labels together with the apparatus for making such labels. My invention also comprehends the particular labels or types of labels made by the method.

In my patent applications for Method and apparatus for making label units, Ser. No. 128,414, filed March 1, 1937, issued to Patent No. 2,220,071, dated November 5, 1940, of which this application is a continuation in part as to the label units and for Price marking tag and method of making the same, Ser. No. 189,515, filed February 9, 1938, I disclose various inventions relating to the manufacture of non-drying adhesive labels and similar products. My present invention distinguishes from my applications as to method and the apparatus and also as to the specific characteristics of the labels, that is, the resulting product. One of the main objects of this invention is to form label strips having the label paper or the equivalent with the non-drying adhesive and providing a backing strip covering the adhesive, the individual labels for removal from the backing strip having one or more edges exposed for ready grasping by an operator and thus facilitate the removal of one label or a series of labels at a time from the backing strips to apply the labels to specific articles.

An object and feature of my invention as to the method and apparatus is a process by which the labels may be made from, for instance, strips of paper, Cellophane, cloth, felt, pliofilm, metal foil or the equivalent and this paper being cut by dies or the like, leaving the labels of the proper shape applied to the backing strip and a matrix, which is the wasted portion of the paper strip, after the "cutting" of the labels. Another feature of my invention relates to the applying of the non-drying adhesive to the strip of label paper in such a manner that portions of the adhesive are removed, thus giving the paper strip the characteristic of having portions thereof coated with the adhesive with preferably longitudinal strips having the adhesive removed.

Another feature of my invention as to the method and apparatus resides in treating the backing strip in order to develop a relatively smooth and hard surface so that the matrix may be readily removed after uniting the paper label strip and the backing strip through the medium of the adhesive, and cutting the matrix by means of dies. In treating this backing material I employ a surface treatment by which a lacquer-like liquid is thinly coated on this backing material. For convenience such backing material is designated as glassine which is a tough type of cellulose product, the lacquer having the characteristics of giving a relatively hard smooth surface to this glassine.

Therefore as to my process and equipment I provide for applying the adhesive to the complete surface of the strip or band of label paper, remove portions of the adhesive in longitudinal parts of the paper, thus leaving the label strip with longitudinal bands of the adhesive. As a separate operation the lacquer is applied to the backing or glassine strip. The two strips are then brought together to cause adherence through the medium of the adhesive. In the further operation by means of a perforator, transverse perforations are made preferably through the glassine only. Then by a die cutting operation the paper label strip is cut, developing the matrix which is waste material and removed from the adhering assembly, thus leaving the individual labels or strips of labels mounted on the backing or glassine strip.

Certain features of my invention as to the apparatus include a means for regulating the thickness of the adhesive coating and the width of the strips to be wiped clear of the adhesive. This resides in employing a wiper cylinder. This is provided with spaced cylindrical collars which contact the paper and wipe off the adhesive from the moving paper strip, the adhesive dropping back into the gum box. In order to regulate the thickness of the coating of adhesive, the cylinder is provided with a series of eccentric surfaces, these being preferably circular but eccentric to the wiping cylinders. Therefore by turning and locking the wiping cylinder assembly, different spaces may be provided between the paper strip and the eccentric surfaces, the size of the space regulating the thickness of the adhesive coating as the wiping cylinders remove the adhesive to the surface of the label surface.

Another feature of my invention relates to the construction of the dies. In one form of reciprocating dies, half cutting dies are arranged end to end and operated over different sized anvils. The feed is adjusted so that one cut is made by one-half of the die and the succeeding cut by the other half of the die, the sides of the dies registering and thus the complete label may be cut leaving the matrix, then by changing the anvils and the distance of feed of the label strips, the length of the labels may be regulated although for the same dies these labels will be of the same width. In this cutting of the label strips, an important feature of my invention resides in the ability to cut through the paper matrix without cutting the backing or glassine strip and this in a "cutting" operation. As an alternative procedure the cutting may be done by rotary cutting dies.

My invention also relates to another type of label in which, especially for small labels, each may be entirely coated with the adhesive and the backing strip has a longitudinal slit intersecting the row of labels. Hence by removing the backing or glassine at one side of the slit, the label may be readily grasped for removal from the other side. This applies to labels removed either by hand or by machine. A further development of my invention relates to a label strip for machine feeding in which I may employ a central de-sensitized section extending longitudinally of each individual label, these being in a row and having a longitudinal slit in the backing strip, thus facilitating separating the backing strip from the labels as to one-half of the backing strip and then each individual label from the other half of the backing strip.

In a further modification of my invention in the method and apparatus for making the labels, I temporarily attach the gummed label paper strip to an endless belt preferably of hard surfaced material which may be a thin metal band. As the endless belt with the paper strip adhering thereto is passed through the cutting die, this cuts the individual labels and forms the matrix. The strip still mounted on the band is then passed adjacent a heating unit which softens the gum and allows the ready removal of the matrix. In this procedure therefore the individual labels are carried on the endless band spaced apart.

In order to transfer the labels from the endless band such as a metal belt to the backing strip or glassine, I flex the band which causes the edge of the label to slightly separate from the band. The strip of backing material such as glassine is then fed into contact with the gummed side of the labels adjacent the point of separation from the metal belt and thus adhere to the backing strip. By this arrangement by employing a differential rate of feeding of the glassine and the labels, I may position the labels on the glassine much closer together than their position is when cut and having the matrix removed. Or again, the labels may be spaced further apart on the backing strip. In addition another advantage of this system is that the glassine or backing strip may be moved transversely to the direction of movement of the labels and thereby place the labels on the glassine end to end.

Another object and feature of my invention is an improvement in the adhesive applying and wiping equipment to secure a desired and variable thickness of the adhesive coating and readily adjust and change the position of the strips of the label paper wiped clean of the adhesive. In this feature I use a cylindrical wiping cylinder with cylindrical but eccentric contact end shoulders. Such end shoulders contact the roller over which the paper dipping into the adhesive tank operates. Then by means of a series of flat strap-like springs, adjustably mounted on a rod and fitted between the cylinder and the surface of the paper, I wipe the adhesive from the paper, leaving longitudinally coated bands separated by the uncoated strips.

Another feature of my invention relates to the construction and operation of the dies and the formation of the product in which in pressure die cutting the dies depress the portion of label paper adjacent to the cut but do not cut through the backing strip where such is a part of a strip. This action causes a lateral displacement of the layer of adhesive and at the same time as the cut is made causes the material, both of the labels and of the matrix formed in the cut to adhere to the adhesive. This action also protects the cutters from becoming coated with the adhesive by cutting therethrough which might be transferred to the upper side of the labels or of the matrix and thus these exposed portions are kept clean. This procedure and the equipment therefore thus forms labels with the marginal edges bend downwardly over the layers of adhesive and attached thereto hence preventing bleeding and the drying of the adhesive.

My present invention as to certain features of the label is a continuation in part of my above noted patent application for Method and apparatus for making label units respecting the label having free or ungummed edges all facing in one or the same general direction as to a single strip and this with or without a marking facilitates the removal of the labels.

My invention is illustrated in connection with the accompanying drawings, in which:

Fig. 1 is a schematic diagram in elevation showing the method and apparatus for making the labels.

Fig. 2 is a vertical section of the device for applying lacquer to the backing strip.

Fig. 3 is an under side view of a cutting die taken on the line 3—3 of Fig. 1.

Fig. 3—b is a section of the cutting edge.

Fig. 4 is a vertical longitudinal section through the die and anvil showing the large size anvil for cutting large labels.

Fig. 5 is a similar section to Fig. 4 showing a narrow anvil for cutting small labels.

Fig. 6 is a schematic section showing the anvil for the large dies with the label blank strip and the elongated labels as cut by the die assembly of Fig. 4.

Fig. 7 is a plan similar to Fig. 6 illustrating the cutting of the short labels.

Fig. 8 is a partial plan showing a rotary die for cutting the labels as if taken in the direction of the arrow 8 of Fig. 9.

Fig. 9 is an end elevation taken in the direction of the arrow 9 of Fig. 8 showing the rotary die acting with the rotary anvil to form transverse punches.

Fig. 10 is a transverse section on the line 10—10 of Figs. 6 and 8 of the label strip as made by either the reciprocating or the rotary dies.

Fig. 11 is an end elevation on a reduced scale taken in the direction of the arrow 11 of Fig. 12 showing the adhesive applying and wiping equipment.

Fig. 12 is an enlarged plan taken in the direction of the arrow 12 of Fig. 11 illustrating the eccentric adhesive wipers mounted on the concentric roll or drum to regulate the thickness of the adhesive coating.

Fig. 13 is a longitudinal section on a reduced scale, such as on the line 13—13 of Fig. 12 illustrating the assembly of the wiping roll and the feed for the paper.

Fig. 14 is an under side view taken in the direction of the arrow 14 of Fig. 17 of label forming ribbons prior to the punching of the individual labels.

Fig. 15 is a plan and a section of the matrix after cutting and removal from the label ribbon or strip.

Fig. 16 is a plan of a section of the finished label strips illustrating two strips each with two rows of labels.

Fig. 17 is a transverse section on the line 17—17 of Fig. 14 in the direction of the arrows showing the backing strip on the bottom.

Fig. 18 is a section on the line 18—18 of Fig. 14 in the direction of the arrows illustrating the transversely perforated backing strip on the bottom.

Fig. 19 is a transverse section on the line 19—19 of Fig. 16 in the direction of the arrows showing the free margins of labels slightly bent up to facilitate removal.

Fig. 20 is a plan of a modified label strip showing the backing having longitudinal slits.

Fig. 21 is a plan of a further alternative form showing the labels having a longitudinal desensitized section, the feeding perforations in the backing strip for machine feeding and the longitudinal slit in the backing strip.

Fig. 22 is a schematic diagram in elevation showing an alternative method and apparatus for making the labels or label strips. In this case the labels and the matrix are cut while the label paper is temporarily attached to an endless belt.

Fig. 23 is an enlarged partial elevation showing the manner of separating the matrix from the endless belt and attaching the labels to the backing or glassine strip.

Fig. 24 is a plan taken in the direction of the arrow 24 of Fig. 25 showing a modified form of adhesive applying and wiping equipment.

Fig. 25 is a longitudinal section taken on the line 25—25 of Fig. 24.

Fig. 26 is a plan taken in the direction of the arrow 26 of Fig. 27 of a further modified construction of labels and label strips illustrating a water wet adhesive on one side of the label or the like and the pressure sensitive adhesive on the opposite side.

Fig. 27 is a transverse section on the section 27—27 of Fig. 26 in the direction of the arrows on a larger scale.

Fig. 28 is a face view of a combination cutting die and weakening perforator for forming contiguous cut labels and at the same time cutting the matrix.

Fig. 29 is a face view of a label strip cut by the die of Fig. 28.

Referring first to the schematic diagram of Fig. 1, the labels are usually made of paper mounted by non-drying adhesive on a backing strip, therefore for convenience the face or labels are designated as made of paper and the backing strip as of glassine, which is a type of material now frequently used, as it provides an excellent backing for the paper and the label strips. Therefore I supply the paper from a paper roll designated 11 in which the web 12 is fed over a guide roller 13 and through the gum box assembly 14 where the adhesive is applied over the whole width of the strip or web and then wiped from certain portions, leaving longitudinal coated strips and uncoated strips, the equipment being described hereunder in detail. A run of the web 14 is next passed through a dryer 16 and thence underneath an idler 17 to a pressure contacting roll 18. The glassine is fed from a roll 19, a web 20 of which passes downwardly through a lacquer box 21 in which the lacquer is applied to the undersurface of the web. This lacquer is for the purpose of providing a hard surface finish to the glassine, binding any small fibers of the glassine into the lacquer and to facilitate separating the paper matrix from the glassine as hereunder detailed. The details of the lacquer box are hereunder described. From the lacquer box there is a run 22 of the web over a roller 23, then underneath an ink applying pen assembly 24, this being of a conventional type for drawing one or more longitudinal lines on the web of glassine. The web then passes over another roller 25, is slit longitudinally by an assembly of slitting blades 26, then the slit web passes underneath a roll 27 and in passing over the roll 18, contacts the adhesive on the web of the paper strip, that is, the lacquered side of the glassine and the adhesive coated side of the paper web contact and immediately adhere together.

A portion of the machine is omitted as this is conventional and at this portion there is a reverse turn indicated at 30. In the preceding section of the machine, the glassine is at the top and the paper web at the bottom. This reversal places the paper web 12 at the top and the glassine web 20 at the bottom. The next operation is by a perforator 31 in which a stationary block 32 is on the top, the paper web riding underneath this block and a vertically reciprocating perforator block 33 has a series of perforator points 34 which are forced upwardly preferably passing only through the glassine. This stock is adjusted so that the perforations do not pass through the paper web. The assembled paper web and glassine web in this procedure move step by step and the next operation is by the matrix cutting dies designated by the assembly numeral 40, these having a stationary anvil 41 on the bottom and a reciprocating cutting die 42 on the top, these being described hereunder in detail. This action of the dies cuts the paper web only, forming the shape of the labels and the paper matrix from the remaining portion of the paper web.

The perforated and assembled strip having the labels cut to shape is then fed adjacent a heater or the equivalent 50, the purpose of which is to heat and slightly soften the adhesive. This heating causes a certain loss of adhesion so that the paper matrix in passing under a roller 51 may be fed upwardly as indicated at 52 to a matrix wind-up 53, this being the paper with a certain amount of adhesive thereon cut from the paper web having the adhesive. The glassine web with the individual labels thereon passes downwardly over a roller 54 and is wound in label strip rolls 55, these being the finished product of the machine except that where desired the long strips of labels with the glassine backing may be severed through the glassine to form strips of definite lengths, having a certain number of labels thereon.

The gum box assembly designated by the numeral 14 and illustrated particularly in Figs. 11, 12 and 13, includes a pan 60 for the adhesive, a suitable frame structure 61 in which is mounted a drum 62 over which the paper strip for the labels is fed. The direction of movement of the strip is indicated by the arrow 63, Fig. 13 and the drum 62 thus rotates in the direction of the arrow 64. The wiper assembly 70 employs a wiper bar 71, which has journal portions 72 which may be journalled in a notched bearing structure 73 on opposite sides of the frame and held in place by one or more spring clamps 74, this being shown as having a bell crank 75 pivoted at 76 to the frame structure with a long arm 77 engaging the shaft portion of the bar 71, a short end 78 and a retraction spring 79, this giving sufficient pressure to hold the wiping bar in position.

The wiping bar is provided with a series of wiping cylindrical collars 80, these being concentric to the axis of the wiping bar and of the shafts or journal portions thereof, the concentricity of the collars being illustrated for instance in a section of Fig. 13. These wiping collars may be of different widths and positioned different distances apart according to the particular type of label tape construction to be made. Between each collar is an eccentric groove 80'. A toothed wheel 81 is secured to one end of the shaft portion of the wiping bar and this has incorporated therewith a dial gauge having a series of numerals 82. A spring latch 83 having a retracting bolt 84 located in a fixed position on the frame has complementary teeth engaging in the teeth of the wheel 81 to positively hold the wiping assembly at rest in the desired position.

In the operation of this wiper the gauge is located in reference to what might be termed a zero marking 85 on the frame in such a manner that it indicates the thickness of the coatings of adhesive to be applied to the paper strip. This thickness of the coating is regulated by the distance between the surface of the eccentric grooves 80' and the portion of the concentric cylindrical wiper collars 80 which contact the paper. This distance may be graduated minutely by rotating the wiper bar 71 with the concentric collars 80 in order to adjust the thickness of the adhesive which remains on the strip of paper. As the strip of paper is fed through the tank or bath of adhesive it picks up adhesive across the whole surface and this is readily wiped off at the places in which the wiper collars contact the moving paper, these collars being held against rotation, and such adhesive drops back into the adhesive tank or receptacle. This gives strips longitudinally of the paper on which there is no adhesive. The thickness of the coating of adhesive is regulated by the wiping done by the cylindrical surfaces of the wiping collars 80 between the wiping cylinders 71. Therefore by changing the location and thus the so-called depth of the eccentric cylindrical sections, variations may be made in the thickness of the adhesive coating. In the illustration there is a center longitudinal wiped section providing for longitudinal slitting of the paper, two longitudinal center uncoated strips providing for an uncoated section between two longitudinal rows of labels and two outside uncoated strips for an uncoated marginal portion of the paper strip. It is desirable to make the labels of different sizes and a considerable variation as to the coated and uncoated strip portions of the label blank ribbon. This is easily accomplished by having in stock a set of the wiper cylinders with the wiping collars located different distances apart and using a greater or a lesser number of these collars as is necessary to develop the particular type of coated and uncoated blank sheet from which the label strips are to be made.

The lacquer box assembly 21, note Figs. 1 and 2, is particularly designed to apply a lacquer to the surface of the backing material such as glassine fed from the roll 19. This lacquer box includes a receptacle 90 with a pair of supports 91 over which are supported an elongated wick 92, the wick dipping into the lacquer in the receptacle. A roller 93 guides the glassine in a reverse movement in contact with the wick and therefore applying a coating of lacquer to one surface of the glassine or other backing material. This lacquer gives a somewhat hard finish to the backing material and should there be any projecting fibers, these are held flat to the surface of the glassine by the lacquer.

The label cutting dies designated by the numeral 40 having the anvil element 41 and the reciprocating cutting die 42 are constructed and operate substantially as follows, note reference particularly to Figs. 1, 3, 4, 5, 6, and 7. The cutting die 42 for all lengths of labels is of the same construction and dimensions. This is provided with a series of individual cutters designated 100. The die contains two sets of cutters, 101 and 102 which may be considered as facing in opposite directions, each of which has a transverse blunt cutting edge 103 and two cutting edges 104 extending therefrom. The die edges are slightly flattened or dulled as indicated at 103' in Fig. 3—b or if desired they may be slightly convex, this being for the purpose of preventing cutting through the backing strip. Therefore there is an open space 105 adjacent the edges 106 of the die element 42. Where the labels have a curved corner, the cutting edges provide the cutting corners 107. There are a number of these individual cutters mounted on the die as shown in Fig. 3 depending on the number of labels to be formed in the width of the combined strips passing therethrough. It is to be understood that the feed of the strips is intermittent.

Where the individual labels are to be of considerable length, for instance as shown in Fig. 6, the anvil block 41 has an elongated or long anvil face 110, such face being substantially equal to the length between the cutting edges 104 which extend in opposite directions on the die block 42 such as shown in Fig. 3. Then in the intermittent operation of the machine and referring to Fig. 6, the reciprocations of the dies produce a half cut of the label indicated at 111, this being formed by the cutters 101 having the transverse edges 103 and the longitudinal edges 104. At the next step forward of the material, the cutters 102 produce a cut 111, thus completing the cutting of the label. The matrix as above defined is the wasted paper after cutting the labels. For instance, in Fig. 6, the individual labels are designated 115 and the matrix 116. Such matrix has a series of longitudinal strips 117, a series of transverse strips 118 and the marginal edge strips 119.

Where the labels are to be quite short as to their length considered longitudinally of the label strips, the anvil die 41 has a short anvil face 120, note Figs. 5 and 7. Therefore in the step by step motion and the operation of the cutting die, the side edges cut by the dies 101 are only the length of the anvil face 120 and on the next step the cutters 102 complete the cutting of the label and therefore form labels which may be quite short as indicated at 121, Fig. 7, the longitudinal measurement of the labels being designated by the measurement line 122. It will thus be seen that by this construction and operation of the dies, that with one set of the cutters and several or more sets of anvil blocks with the different length anvil faces, labels may be cut having materially different dimensions as to their length longitudinally of the label strip but all being of the same width transversely of such strips. In this operation the action of the dies is controlled so that they cut through the paper or label strip only and not through the backing or glassine strip. It is to be noted in reference to Fig. 1 that a reversal or a half turn has been made as indicated by the space portion 30. The mechanism for making the reversal is quite well known and is hence not illustrated in detail.

In order that the matrix may be readily separated from the completed label strip after passing through the cutting dies, a heating unit 50 is utilized. As presented in the illustration of Fig. 1, this is an electric heater and the strips including the label strip, the glassine or backing strip and the cut matrix pass over this heater. This softens the adhesive a sufficient amount to allow ready separation of the matrix, such matrix being drawn upwardly after passing under the roller 51 and then is wound on the paper matrix roll 53. The finished label strip including the backing; that is, the glassine and the individual cut labels is then wound on the label strip roll 55.

As above mentioned, the perforating of the strips transversely is done by the perforator assembly 31. This has intermittent action. The individual perforators are of the known type. The perforated points 34 are actuated so as to perforate the backing strip only and not to cut or perforate through the paper strip from which the individual labels and the waste matrix is formed.

The characteristics of the label strip and the labels cut therefrom is substantially as follows, having reference particularly to Figs. 14 through 19. Fig. 14 is an underside view of the strip having the backing, the adhesive and the paper strip and the labels. In the illustration the backing or glassine is designated by the numeral 130 having the longitudinal slit 131 produced by the slitting blades 26. The paper strip 132 is preferably of approximately the same width as the backing strip and has the adhesive coatings 133 at the marginal portions and 134 adjacent the center portions. The adhesive is arranged in longitudinal strips with a center uncoated strip 135 and uncoated strips 136 between the marginal coating 133 and the center coating 134. These uncoated strips are produced by the wiper used in connection with the gum box of the assembly 14. There is also preferably an uncoated marginal portion 137. In a further step the perforator 31 forms a series of transverse perforations 140 in the backing or glassine strip only. These perforations may come between the label or be located a designated number of labels apart. This facilitates the long strip either being readily folded into definite lengths or readily severed into specific lengths. In the third operation of cutting the labels and the matrix, this leaves the strip of Fig. 19 with the space 145 between the individual labels 146 on one margin of the backing strip separated by the slit 131. There is also a space 147 between the label 146 and the outer label 148 on the same strip. At the space 147, the labels have a free or uncoated margin 149 indicated by the ruled line 150, note Fig. 16, which line has been drawn by the pen assembly 24, thereby indicating to the user the free or unattached edge of each individual label so that such label may be easily removed from the backing strip. As above mentioned the matrix or the waste paper material includes the marginal longitudinal portions 152, the center portion 153 and the portion 154 between the individual labels on each half of the glassine strip together with the transverse cross web 155, note particularly Fig. 15. Such matrix at these portions is wound on the matrix roll 53 and is waste material. It however has no longitudinal adhesive and is cut from the longitudinally uncoated portions of the paper but at each transverse web 155 has an adhesive coating. However, on account of the heating provided by the heater 50, the matrix readily separates from the composite label strip which includes the glassine backing and the individual labels attached to the backing by the adhesive.

In Fig. 20 I illustrate a modified form of the label strip designated by the numeral 160 in which a relatively wide backing or glassine strip 161 has rows 162 of individual labels 163. These are illustrated as circular and the labels in each row in contact. In this case the labels are completely coated over their entire surfacing with the adhesive and thus each label is attached to the backing strip without any free edge. In order to readily separate the labels from the backing strip, such strip is provided with a series of longitudinal slits 164. Such slits intersect the labels arranged in the rows and preferably at substantially the center of each individual label. Therefore by removing one section of the glassine indicated at 165, the edge of the labels are exposed for ready removal from the adjacent strip 166. The labels may then be removed for use. The various sections of the glassine may be removed strip by strip until all of the labels are used up.

Fig. 21 discloses a further form of label strip with a de-sensitized center section, such label strip being designated by the assembly numeral 170 in which the glassine or backing strip 171 has a longitudinal center slit 172. The individual labels 173 have the adhesive 174 forming the attachment to the backing, however the center portion 175 is de-sensitized by a coating of mica powder or equivalent material. Thus the de-sensitized strip is in alignment with the longitudinal slit 172. Where it is desired, perforations 176 may be put through the backing to allow for machine feeding. If desired, the ends of the individual labels may be joined by perforations which penetrate the paper stock only.

In Figs. 22 and 23 I illustrate a modified method and apparatus for making the labels attached to a backing strip in which the cutting of the labels and the matrix is made in connection with a moving belt. In this construction an endless belt assembly 200 is utilized. The belt is preferably a thin band of flexible metal, or any suitable hard yet flexible material. The endless belt operates over a power roller 201. Its upper run 202 carries through to an end roller 203, there being a feed to an idler roller 204, making the down run 205 practically at an obtuse angle to the upper run. There is then a lower run 206 leading to another lower idler 207 from which the belt has an upgoing run 208 leading to the power drive roller 201. The direction of movement of the endless belt is indicated by the arrow 209.

The gummed paper strip which may be prepared as shown in Fig. 1 by passing the paper through a gum box with wipers or by using a construction hereunder described in connection with Figs. 24 and 25. This paper designated 210 with the gum side down is fed between a pressure roller 211 and the metal belt operating over the power roller 201. This causes the adhesion of the gum strip to the upper surface of the upper run of the endless belt. The movement is intermittent and the feed is through a cutting die assembly 215. This has an anvil 216 on the underside of the upper run of the belt and a reciprocating die 217 above the paper. The construction and operation may be the same as described in connection with the die assembly 40 of Figs. 1, 3, 3—b, 4 and 5. This cuts the label and also forms the matrix, this being the waste paper. The cut labels and the matrix still adhering to the upper run of the belt pass over a heater 220 which softens the gum and allows a ready removal of the matrix. This matrix strip 225, not Fig. 23, is raised in a gradual manner by passing over a matrix roller 226 elevated above the endless belt. Then by means of an upwardly extending run 227, the matrix is wound on a matrix roll 228. On account of the labels adhering to the upper run of the endless belt, such labels are not lifted with the matrix but continue to the end roller 203. This develops in effect an obtuse angle of the belt indicated at 229, Fig. 23 of the upper run 202 and the run 205 of the belt. This causes the leading end 231 of each individual label indicated at 230 to separate from the metal or other endless belt and extend in substantially a straight line of its travel. At this point the glassine or backing strip is attached.

The glassine is indicated as being mounted in a roll 235 from which a strip 236 leads upwardly to a stationary corner block 237, note Fig. 23. This bend has an acute angle corner 238 over which the glassine is bent or folded and as the individual labels are fed forward in the direction of the arrow 239, each label becomes attached to the upper surface of the glassine. The movement is intermittent unless rotary dies are used and the strip is fed through the perforator 240. This is provided with the anvil 241 and reciprocating perforator 242 which forms the perforations through the glassine or backing strip. Thence by means of an idler or angular turn roller 245, the label strip is conveyed to a label roll 246 on which it is wound. It will be obvious that the speed of movement of the glassine may be either slower or faster than the feeding movement of the endless belt on which the labels are conveyed and thus vary the spacing of the individual labels on the backing strip.

In the construction of the wiper assembly, Figs. 24 and 25, a drum 250 is utilized to feed the paper to dip in a pan 251 having the adhesive. The direction of movement of the label strip is that of the arrow 252. The drum 250 has cylindrical ends 253 spaced beyond the lateral edges 254 of the label strip. A gauge cylinder 255 has a long and central cylindrical portion 256 and cylindrical contact ends 257. The contact ends 257 are concentric to the ends of the shaft but eccentric to the center portion 256 and contact the cylindrical ends 253 of the drum 250, being held in contact therewith by any suitable support and rotatably mounted. Thus by turning the assembly 255 on its axis, the spacing distance indicated by the distance marks 258, note Fig. 25, may be varied between the drum 250 and the portion 256 of the cylinder 255. This regulates the thickness of the adhesive on the paper strip.

The wipers 260 consist of a series of flat resilient metal strips 261, these having eyes 262 at their upper end fitting on a stationary adjustment bar 263 mounted in a suitable manner so that the strips may extend downwardly between the drum 250 and the cylindrical surface 256. Thus by having the bar 263 offset to one side of the space 258, the strips contact the cylinder 256 for instance at substantially the point 264 and the drum 250 at the point 265. They thus give a wiping action causing the label strip to have the longitudinally extending adhesive coatings 266 (note Fig. 24) with the wiped or uncoated strips 267. This forms a simple mechanism for gauging the thickness of the adhesive as well as changing the position and arrangement of the wiped strips. The adhesive drops back into the tank or vessel 251.

Figs. 26 and 27 represent a further modification of my invention in which the labels are utilized for attaching sheets of paper or other devices removably to some surface. In this case the label strip as a whole is designated by the assembly numeral 275 in which a backing such as a glassine strip 276 is utilized and a series of individual labels such as those made of paper or the like designated 277 are attached to the glassine by the pressure sensitive adhesive 278. The upper surface of each label has a coating of gum 279 usually of a water wetted type, that is, it requires addition of water or some softening liquid to cause the gum to adhere to a surface. These labels may be made in the manner of the process described above in which a matrix is removed and the backing strip has weakened cross lines 280 for the purpose of readily separating the individual labels. It will be obvious that the side having the glue 279 may be permanently attached to a sheet of paper or the like, then when desired, the glassine backing may be removed and the label attached by the pressure sensitive adhesive to a surface, after which removal may be made by removing the label with the paper attached thereto from such latter surface. The type of label of Figs. 26 and 27 also has considerable use for attaching for instance large sheets of paper such as diagrams, pictures, etc., in school classes to a wall or supporting structure in which procedure a number of labels may be attached to the back of the sheet or to the back of the picture by a permanent attachment by the water wet glue 279. Then when it is desired to hang the large sheet to a wall or other structure, the glassine is removed and the pressure sensitive adhesive of each label is used to form a temporary attachment and support the whole weight of the large sheet of paper, picture or the like.

In Fig. 28 I illustrate the face of a die somewhat of the type shown in Fig. 3. This has a die plate 290 with the reverse position cutters 291 which may be somewhat of the type shown in Fig. 3—b. These are arranged with a series of longitudinal cutting blades 292 and 293 with rounded corners 294. The transverse cutter is by means of a perforated blade 295 which is provided with notches and thus makes a weakening line instead of a complete perforation. This die is used with a suitable mandrel such as a wide faced mandrel of Fig. 4 or one having a short face such as Fig. 5 depending on the length of labels to be cut. The label strip including the label paper with the pressure sensitive adhesive and the backing or glassine is fed in intermittently through the dies and these are operated to make a cut through the paper strip only, thus cutting the individual labels to the desired size and at the same time cutting the matrix.

The immediate result of the action of the dies of Fig. 28 is to form a strip as shown in Fig. 29 having the backing strip 296 of the glassine or the like. The individual labels 297 have the marginal cuts 298 and the perforated transverse cuts 299. This also forms slight notches 300 at the side and at the inside portions there are the somewhat diamond shaped cuts 301 made by the rounded corners 294 of the dies. In this construction it is desirable to have the label strip with a wiped section or de-sensitized longitudinal portion 302. The marginal portions 303 therefore form a matrix which is readily removed by the equipment and procedure of Figs. 1 or 22 and 23, the diamond shaped center parts 301 being unattached by adhesive are also readily displaced, thus leaving a series of labels attached to the backing strip, the labels having distinct longitudinal cuts defined by the cut edges 298 and have the weakened lines 299. This allows the labels to be readily separated from the backing strip when desired, the labels readily tearing one from another on the weakened line 299. It is obvious that if desired the paper strip may have no de-sensitized bands in which case the whole area of the label is attached to the backing strip.

In all of the label strip cutting to form individual labels at the same time cut the matrix which may be subsequently removed, the cutting is by the medium of pressure dies or so-called pressure cutter. This develops a construction as indicated in Fig. 10 and 19 in which the marginal edge 310 is pressed downwardly. This causes a lateral slight compression of the pressure sensitive adhesive, the paper of the label thus has a downwardly pressed fin which covers the edge of the pressure sensitive adhesive, such fin extending substantially to the backing strip. Therefore at all of the sides of the label where the cut contacts the adhesive, there is an effective seal which prevents the so-called bleeding of the adhesive at the edge of the labels and further as air is excluded it retards the drying of the adhesive. Manifestly the prevention of the bleeding is of a decided advantage as it prevents the strips when in a roll from adhering one to the other and to be stacked in sheets. At the opposite edge where there is a desensitized section the paper is pressed downwardly in the pressure cutting, thus being positioned quite close to the backing strip and restricting the drying and bleeding of the adhesive. Due to the die cutting forcing the edges of the label paper and of the matrix over the layer of adhesive which is laterally displaced, the dies are protected from contact with such adhesive and therefore do not become coated and do not transfer adhesive from the layer underneath the label to the upper side of the label or matrix.

In all forms of the labels attached to the backing strip by pressure sensitive adhesive, it is of advantage to heat the label a sufficient amount to lessen the adherence of the adhesive for the purpose of either removing the labels from the backing strip or separating the backing strip from the labels as shown in accordance with Fig. 20.

In the die cutting of the label strips to outline the individual labels and form the matrix afterwards removed, it is necessary to make provision for accurate adjustment of the cutting dies especially as it is desired to prevent any cutting of the backing strip such as glassine, therefore in Fig. 4 I illustrate wedge adjusters designated by the numeral 315 in which there is a true level supporting base 316, an upper wedge 317 attached to the anvil by pins 318 or the like and an adjustable slide wedge 319. By adjusting the wedge 319 the anvil may be raised or lowered by minute measurements. The adjusting mechanism may be connected to a rotating shaft having a threaded connection with the wedge so that a partial turn of the shaft may shift the wedge sufficiently to make the minute adjustment.

Where the labels and label strip are cut by rotating dies as indicated in Figs. 8 and 9, this employs the cutting die assembly 330 employing the rotary die roll 331 having a series of individual dies 332 the same shape and outline as the individual labels, these dies being characterized as having longitudinal edges 333, transverse cutting edges 334 and rounded corners 335. Where it is desired to form a series of transverse perforations such as 140, Fig. 18, this is done by a synchronized perforating roll 340 having a series of perforators 341, this perforated roll being geared to the die roll so that the perforations may if desired be made between adjacent individual labels or at the desired spaced intervals including a number of labels between the perforations where it is desired to have relatively short lengths of unperforated backing strips.

Various changes may be made in the details of the construction without departing from the spirit or scope of the invention as defined by the appended claims.

I claim:

1. In a device as described, means for cutting the outline of individual labels from a web comprising an anvil over which the label web is moved, a reciprocating cutting die with longitudinal and transverse cutting edges arranged back to back with open ends omitting the cutting edges and means to intermittently feed the web in synchronism with the reciprocating motion of the cutting die whereby the transverse cutting edge forms the end cuts for a series of labels and the longitudinal edges form the longitudinal sides and making two cuts for each complete label.

2. In a device as described, the combination of a supporting means for feeding a web of label paper having a pressure sensitive adhesive on one side, the feeding means including a moving hard belt to which the adhesive temporarily adheres, a cutting die operating on the said web and cutting the outline of individual labels and at the same time forming a matrix, means to remove the matrix leaving the individual labels on the hard belt and means to attach a backing strip to the individual labels as they leave the hard belt, the labels adhering to the backing strip by the pressure sensitive adhesive.

3. In a device as described, the combination of a cutting die including replaceable anvils constructed and adapted to have a long or a short face considered longitudinally of the direction of feed of a label web, means to intermittently feed a label web thereover, a reciprocating cutting die having a transverse cutting edge joining at least two longitudinal cutting edges extending in opposite directions therefrom thereby defining at least a pair of U shaped cutting edges open at opposite ends, means to synchronize the reciprocation of the cutting die and the feed of the web to perform two cuts to make a complete label and at the same time make severing cuts forming a matrix of the remaining portion of the web.

4. In a device as described, means for cutting the outline of individual labels from a web comprising an anvil over which the label web is moved, a reciprocating cutting die with longitudinal and transverse cutting edges arranged back to back with open ends omitting the cutting edges and means to intermittently feed the web in synchronism with the reciprocating motion of the cutting die whereby the transverse cutting edge forms the end cuts for a series of labels and the longitudinal edges form the longitudinal sides and making two cuts for each complete label, the transverse cutting edge of the die being broken to form perforations connecting two adjacent labels.

5. The method of making labels which comprises forming a laminated strip of paper, adhesive, and glassine, and dieing out the label through the paper without at the same time dieing out the label shape through the glassine.

6. The method of making labels which comprises forming a laminated strip of paper, adhesive, and glassine, and dieing out the label through the paper without at the same time dieing out the label shape through the glassine, and removing the paper matrix surrounding the died out label and removing therewith the adhesive attached thereto leaving the label and its adhesive on the glassine.

7. The method of making labels which comprises forming a laminated strip of label material, normally tacky adhesive, and thin, flexible, inelastic glassine, dieing out the label shape through the label material without at the same time dieing the label shape in the glassine.

8. The method of making labels which comprises forming a laminated strip of label material, normally tacky adhesive, and thin, flexible, inelastic glassine, dieing out the label shape through the label material without at the same time dieing the label shape in the glassine, and removing the paper matrix surrounding the died out label and removing therewith the adhesive attached thereto leaving the label attached by its adhesive to the glassine.

9. The method of making labels which comprises forming a laminated strip of label material, normally tacky adhesive, and thin, flexible, inelastic lacquered glassine, positioning said strip on an anvil and dieing out the label shape through the label material without at the same time dieing the label shape in the glassine.

10. The method of making labels which comprises forming a laminated strip of label material, normally tacky adhesive, and thin, flexible, inelastic lacquered glassine, positioning said strip on an anvil and dieing out the label shape through the label material without at the same time dieing the label shape in the glassine, and removing the label matrix surrounding the died out label and removing therewith the adhesive attached thereto leaving the label and its adhesive on the glassine.

RAY STANTON AVERY.